May 2, 1950
J. Y. DUNBAR ET AL
2,505,757
HIGH-CAPACITY, LOW-INERTIA CHECK
VALVE FOR JET PROPULSION MOTORS
Filed April 24, 1945
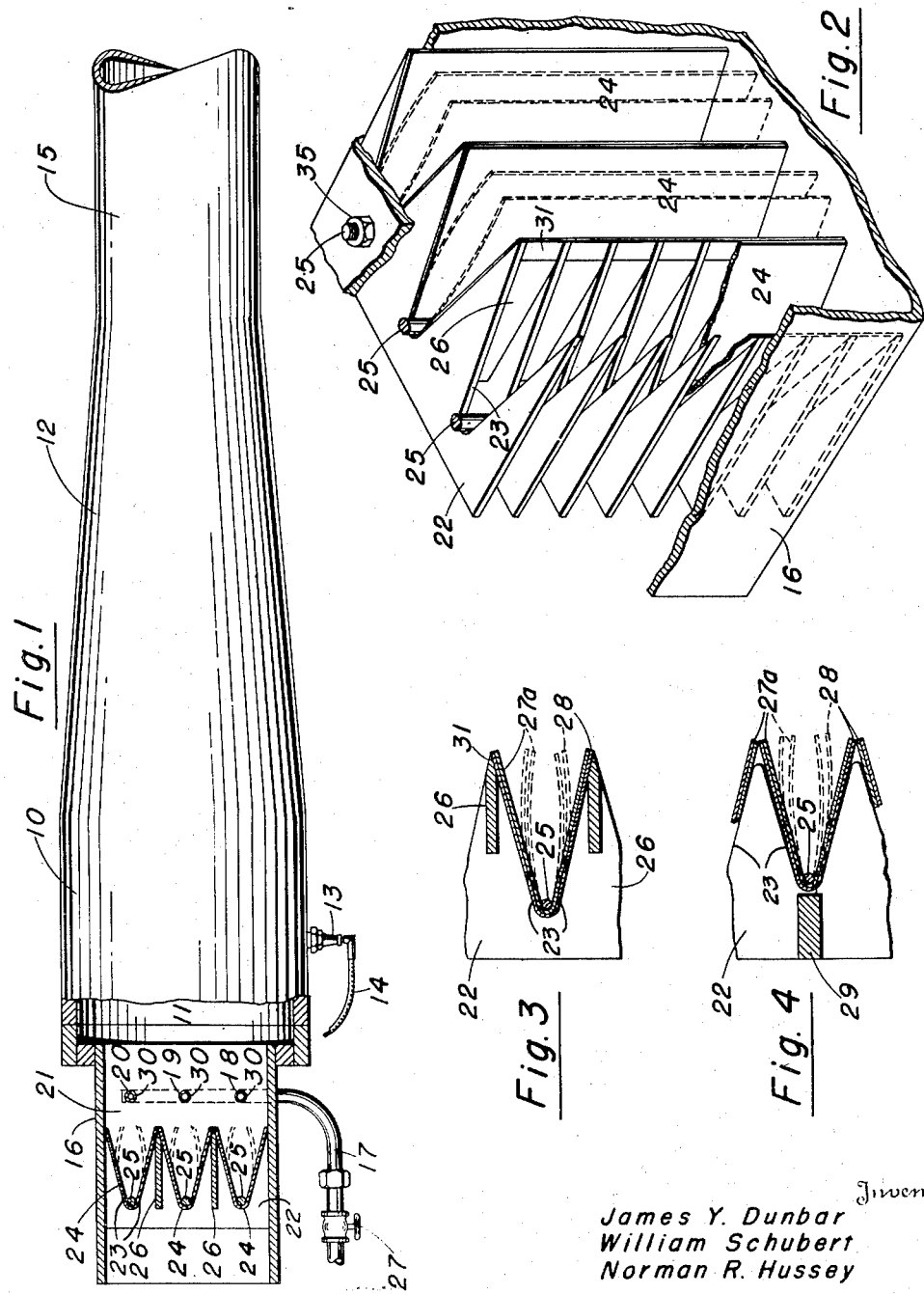
Inventors
James Y. Dunbar
William Schubert
Norman R. Hussey
By Ralph L Chappell
Attorney Patented May 2, 1950

2,505,757

UNITED STATES PATENT OFFICE 2,505,757

HIGH CAPACITY, LOW INERTIA CHECK VALVE FOR JET PROPULSION MOTORS

James Y. Dunbar, William Schubert, and Norman R. Hussey, United States Navy

Application April 24, 1945, Serial No. 590,098

1 Claim. (Cl. 60—35.6)

(Granted under the act of March 3, 1883, as amended April 30, 1928; 370 O. G. 757)

This invention relates to improvements in jet propulsion motors and has special reference to jet devices of the resonant type, known as resojet motor, which operates on the principle of intermittent firing of an atmospheric air-fuel mixture in a chamber to produce a high velocity rearwardly directed jet of the exhaust gases. The high velocity jet produces forward thrust on the motor by direct jet reaction.

An object of the invention is to provide a jet propulsion device with an automatically operated valve which is of high capacity and low inertia.

A further object of the invention is to provide a jet propulsion device with a valve which is simple in construction and operation and also adapted to withstand high pressures and temperatures.

A still further object of the invention is to provide a jet propulsion motor with an inexpensive valve which, therefore, can be used on expendable devices.

With the foregoing objects in view, the invention resides in the parts and in the construction and arrangements of parts hereinafter described and claimed and illustrated in the accompanying drawing wherein:

Fig. 1 is a plan view partly in section of the jet motor.

Fig. 2 is a fragmentary perspective view of the frame and valve assembly.

Fig. 3 is a sectional view illustrating a modification of the invention.

Fig. 4 is a sectional view illustrating still another embodiment of the invention.

Referring to Fig. 1, the cylindrical member 10 which forms the combustion chamber 11 has mounted thereon a spark plug 13 with a wire 14 connecting it to a source of electrical energy (not shown). On one end of the cylindrical member 10 is welded or otherwise attached thereto a frusto conical pipe member 12 at its enlarged end. The cylindrical member 15 which constitutes the exhaust nozzle of the jet motor is attached to the smaller end of the frusto conical member 12.

At the forward end of the cylindrical member 10 there is in open communication with and attached thereto a rectangular housing or frame 16 centrally disposed on the longitudinal axis of the cylindrical members 10 and 15. A fuel conduit 17 mounted on the housing 16 has the branch conduits 18, 19, and 20 which extend into the mixing chamber 21 formed by the frame 16. Each of the conduits 18, 19, and 20 has numerous longitudinally disposed nozzle openings 30 through which the liquid or gaseous fuel is discharged into the mixing chamber 21 where the fuel mixes with the air to form an explosive mixture. The fuel conduit 17 is connected to a tank (not shown). A valve 27 in the fuel line 17 controls the rate of flow of fuel to the discharge nozzles 30.

As shown by Figs. 1 and 2, a system of valve means for controlling the flow of air into the mixing chamber 21 is situated in the frame 16. A plurality of rectangular plates 22 spaced apart in parallel relation by the spacer plates 26 are rigidly mounted in the frame 16 to form a valve grill. Each of the valve plates 22 has a number of U-shaped slots 23 cut out therefrom; the number of slots in each plate 22 is determined by the number of valves utilized by the jet motor although the preferred embodiment shown by the drawings has three valves, any desired number of valves may be used. Each of the sets of slotted portions 23 form a valve support for the flexible reed valves 24. The lower portions of each of the grill spacer plates 26 and of the U-shaped slots 23 are machined to form a valve seat 31 for the reed valves. The reed valves 24 are held into position in the U-shaped slots 23 of the valve grill 22 by the valve supporting pivot members 25 which are threaded at each end, fitted through holes bored in the frame 16 and secured in position by the nuts 35.

The flexible reed valves 24 made of spring steel or any similar material suitable for exposure to high temperatures and pressures are U-shaped in cross section with their rounded apex portion fitting around the curved surface of the valve supporting pivot member 25. The U construction of the reed valves 24 has the inherent quality of permitting the balancing of the forces of one vibrating leg or wing by the other and thus preventing the transfer of vibrational energy to the support structure. This permits the use of lighter weight materials for the valve support structure. By rounding out the apex portion of the reed valves 24 so as to fit the curved surface of the valve pivot rods 25, high localized stresses in the reed valves are prevented since the contact point between the reed valve 24 and the pivot member 25 varies in position throughout a cycle of operation.

Due to the fact that the reed valves 24 are exposed to high temperatures and pressures they are appreciably damaged after a short period of time of operation. In Fig. 3 a set of two reed valves 27a and 28, superimposed one on the other, is mounted in the slots 23 of the valve grill 22.

The two reed valves operate as a single valve and also provide each other with a cushioning effect as the valves vibrate from one position to the other. The reed valve 27a which is exposed to the high temperature of the exploding gases protects the reed valve 28.

Fig. 4 shows a modification of the invention. The reed valves 27a and 28 are extended in length so that when the valves are in a closed position the outer edges of the adjacent reed valves abut each other to form a seal. The grill members 22 are supported in spaced relation by means of the grill spacer plates 29 which are attached to the grill members 22 in alignment with the valve pivot members 25. This modification permits a greater capacity flow of air for the reason that the cross sectional area obstructing the free flow of air through the grill 22 is less than in that of the basic invention.

In the normal operation of the jet propulsion motor the liquid or gaseous fuel flows past the manual valve 27 in the fuel conduit 17 and into the branch conduits 18, 19, and 20. There it is discharged into the mixing chamber 21 through the nozzle openings 30 where the vaporized fuel mixes with the incoming air to form a charge. This explosive mixture is ignited in the explosion chamber 11 by the residual heat created by the previous explosions or by a spark from the spark plug 13 when first starting the jet motor. The gas pressure caused by the explosion is exerted in all directions thus causing the legs or wings of the flexible reed valves 24 to swing outwardly to a closed position. This permits the gases to escape to the atmosphere only through the exhaust nozzle 15. The reactive force set up by this discharge of the gases in one direction causes the jet motor to move in the opposite direction.

It has been discovered that the jet motor described herein follows closely the Helmholtz resonator and organ pipe theories concerning the relation between the capacitance of the combustion chamber, inertance of the nozzle pipe, and the frequency of the explosion chamber, the inertance being a commonly known resonance characteristic of pipes corresponding to "inductance" in resonant electric circuits, and is a quantity proportional to the density of the gases flowing through the pipe and the ratio of the length of the pipe to its cross-sectional area. Consequently, at a certain time after explosion of the charge, the time interval determined by the resonant frequency of the jet motor, there is an instantaneous drop in pressure in the explosion chamber 11. The force exerted on the reed valves 24 at this time by the atmospheric air pressure causes the valves 24 to swing on the valve pivot members 25 to an open position permitting air to flow past the grill 22 into the mixing chamber 21 where it mixes with the atomized fuel to form a charge. The explosive charge flows into the chamber 11 where it is ignited as previously explained, thus completing a cycle of operation. With a resojet about 4½ feet long, the resonant frequency has been found to be about 114 cycles per second which also is the number of explosions occurring each second while in resonant operation.

The frequency of the reed valves 24 is designed so as to give them a higher natural frequency than the resonant frequency of the jet motor. This natural high frequency of approximately 148 cycles per second causes the reed valves to respond more quickly to pressure variations. The frequency of the reed valves is determined by the formula $f = 33,000\ t/l^2$ cycles per second where $t$=thickness of reed valves and $l$=vibrating length in inches.

The reed valves 24 are preformed in shape to fit in their slots 23 of the valve grill 22 and inserted into position so that the reeds exert little or no pressure against the supporting grill. Therefore, when the jet motor is in operation the reed valves 24 tend to open rather wide after each explosion allowing a large charge of air to enter the chamber 11. This allows a more complete burning of the fuel and results in a higher reactive force imparted to the motor.

While a preferred embodiment and several modifications of the invention have been shown for purposes of illustration, it is to be clearly understood that various changes in details of construction and arrangement of parts may be made without departing from the scope of the invention as set forth in the appended claim.

The invention described herein may be manufactured and used by or for the Government of the United States of America for governmental purposes without the payment of any royalties thereon or therefor.

What we claim is:

In a jet propulsion motor, valve mechanism comprising a frame, a valve supporting grill mounted within said frame, flexible reed valves and means supporting said reed valves adjacent said grill, said valves having a natural frequency of vibration substantially 30% in excess of the Helmholtz frequency of said motor.

JAMES Y. DUNBAR.
WILLIAM SCHUBERT.
NORMAN R. HUSSEY.

REFERENCES CITED

The following references are of record in the file of this patent:

UNITED STATES PATENTS

| Number | Name | Date |
|---|---|---|
| 1,022,157 | Scott | Apr. 2, 1912 |
| 1,586,226 | Tartrais | May 25, 1926 |
| 1,983,405 | Schmidt | Dec. 4, 1934 |
| 2,199,307 | Eichelberg | Apr. 30, 1940 |

FOREIGN PATENTS

| Number | Country | Date |
|---|---|---|
| 386,908 | Great Britain | Jan. 26, 1933 |
| 412,478 | France | May 3, 1910 |
| 640,228 | Germany | Dec. 28, 1936 |

OTHER REFERENCES

"Wasted Talent" in Flight, issue of Oct. 5, 1944, page 366.